J. A. C. WRIGHT.
ROAD VEHICLE WHEEL.
APPLICATION FILED NOV. 19, 1910.

1,001,794.

Patented Aug. 29, 1911.
2 SHEETS—SHEET 1.

WITNESSES
W. P. Burst
John C. Sanders

INVENTOR
John Allan Cecil Wright
BY
Wm Mallau White
ATTY

J. A. C. WRIGHT.
ROAD VEHICLE WHEEL.
APPLICATION FILED NOV. 19, 1910.

1,001,794.

Patented Aug. 29, 1911.

2 SHEETS—SHEET 2.

WITNESSES
W. P. Burke
John C. Sanders

INVENTOR
John Allan Cecil Wright
BY
M. McMillan White
ATTY

UNITED STATES PATENT OFFICE.

JOHN ALLAN CECIL WRIGHT, OF BIRMINGHAM, ENGLAND.

ROAD-VEHICLE WHEEL.

1,001,794.  Specification of Letters Patent.  Patented Aug. 29, 1911.

Application filed November 19, 1910. Serial No. 593,211.

*To all whom it may concern:*

Be it known that I, JOHN ALLAN CECIL WRIGHT, a subject of Great Britain, residing at Birmingham, England, have invented new and useful Improvements Relating to Road-Vehicle Wheels, of which the following is a specification.

This invention relates to road vehicle wheels which are provided with detachable rims of the type comprising a gapped annulus provided with tire retaining flanges and fitted with a detachable segmental portion also provided with tire retaining flanges and which when in position completes the rim and on detachment permits the ends of the latter to be sprung together for the removal of the pneumatic or other tire.

The object of this invention is to provide an improved construction of the rim whereby the segmental portion can be more conveniently detached and attached than heretofore.

The invention comprises the formation of the segmental portion aforesaid in two parts which are placed in position and removed from opposite sides of the wheel rim, and also the connection by cotters or their equivalent to the inner side of the adjacent ends of the rim of a plate to which the said parts are secured, so that with the tightening of the cotters the ends of the rim are drawn together to produce tight joints at the ends of the detachable parts, or expanded for liberation from the wheel.

Figure 1:
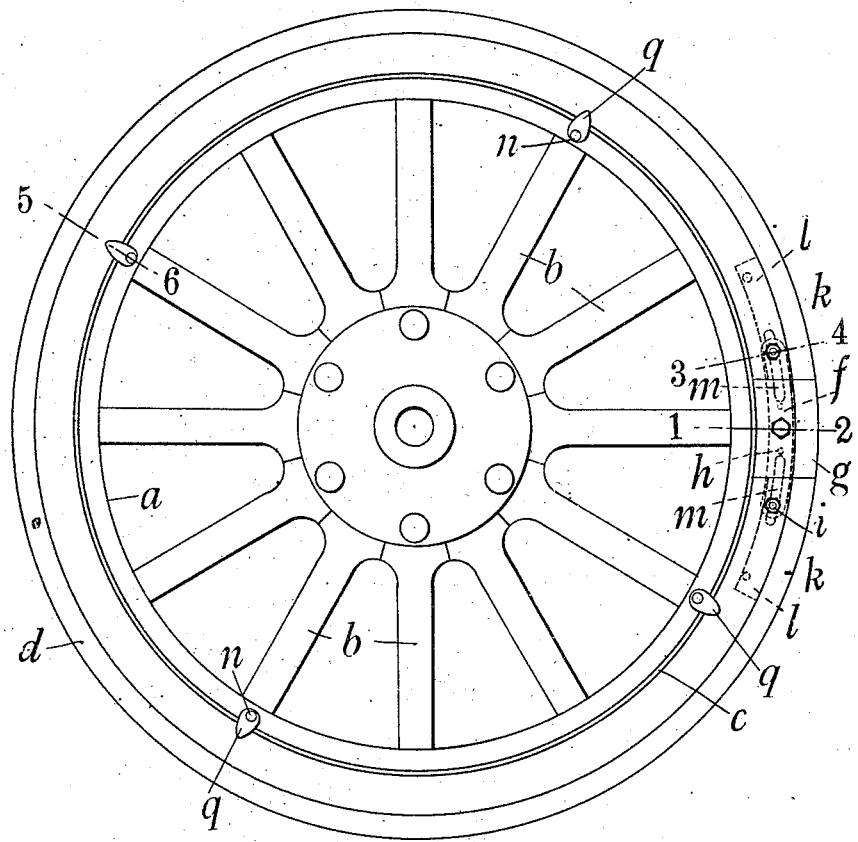
Figure 2:
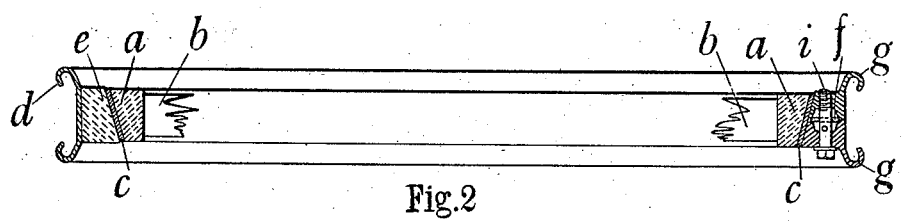
Figure 3:
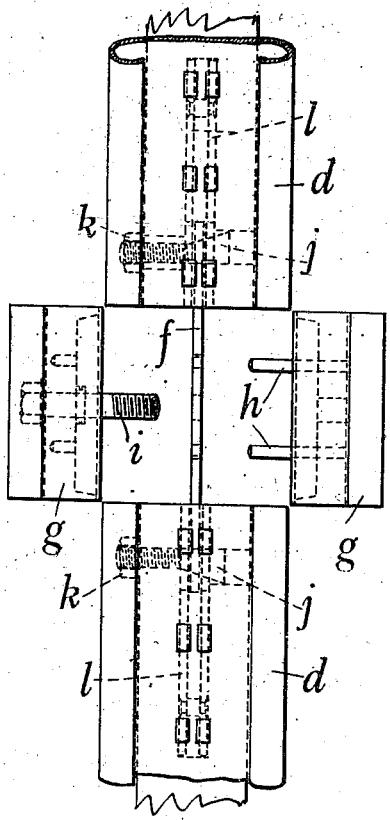
Figure 4:
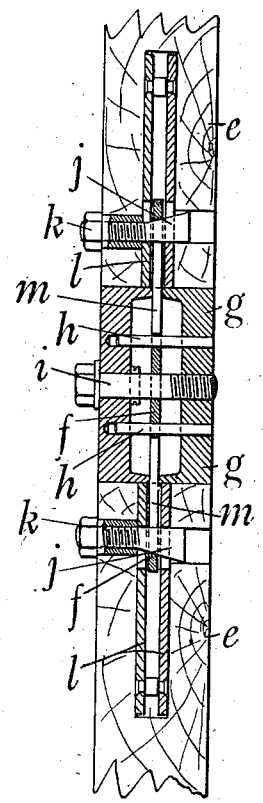
Figures 5, 6, 7:
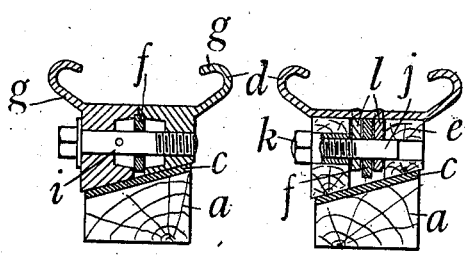

Referring to the two accompanying sheets of explanatory drawings;—Figure 1 is a side elevation and Fig. 2 a cross section of a motor vehicle wheel constructed in accordance with this invention. Fig. 3 is a plan of a part of the wheel showing the detachable segmental portions removed from the rim and Fig. 4 is a sectional plan of the same part showing the segmental portions in position. Figs. 5, 6 and 7 are respectively cross sections through the wheel rim on the lines 1—2, 3—4, 5—6, Fig. 1. Figs. 3 to 7 are all drawn to a larger scale than Figs. 1 and 2.

The same reference letters in the different views indicate the same parts.

The wheel shown comprises a felly *a* to which are secured the spokes *b* in the ordinary manner. The felly is provided with a metallic band *c*, and on this is mounted a detachable rim comprising a metallic ring *d* carrying the usual pneumatic or other resilient tire and a reinforcing wood annulus *e*. The inner surface of the latter and the outer surface of the felly *a* are made to a tapered configuration as shown. In the application of the invention to such a wheel, both the part *d* and the reinforcement *e* of the detachable rim are gapped as heretofore, and across the gap is arranged a metal plate *f* so that it occupies a central position between the opposite edges of the rim and is perpendicular to the underside of the part *d*. The detachable segmental portion is of the same section as the rim and is divided centrally into two parts, or in other words consists of two parts *g*. Each part is preferably made so that when two parts are in position they fill the gap between the ends of the rim and complete both the inner and outer periphery of the rim. A continuous surface is therefore provided for supporting the pneumatic tire and also for embracing the outer periphery of the felly *a*. The segmental parts are doweled together by pins *h* which pass through the central plate *f* and are secured by a transverse screw *i* which enters a nut or screwed aperture provided in one of the said parts.

To detach the segmental parts from the rim, the transverse screw *i* is released and the parts can then be separated sidewise and respectively withdrawn from the opposite sides of the rim as shown in Fig. 3. By constructing the segmental portion in two parts and arranging for them to be separated or placed together from the opposite sides of the wheel, a great convenience is provided in the removal or replacement of the tire, as the parts can be detached or replaced without any interference from the beaded or thickened edges of the tire. When the parts are removed the ends of the rim can be drawn together by any convenient means (such as a detachable right and left hand coupling screw fitted with ratchet operating lever and attached by any convenient means to opposite ends of the rim) for diminishing the diameter of the rim and enabling the tire to be easily removed or replaced.

The plate $f$ above referred to for connecting together the ends of the rim and supporting the detachable parts is preferably secured by a pair of transverse tapered cotters $j$ fitted with external nuts $k$. Each cotter passes through a pair of metal plates $l$ riveted to the inner side of the rim as well as through the plate $f$. It will be observed that the ends of the plate $f$ are placed between the plates $l$. The plate $f$ is provided with slots $m$ so that the cotters do not interfere with the contractile movement aforesaid. Also the plates $l$ are slotted adjacent to the cotters to permit a sufficient axial movement of the latter therethrough. Suitable holes are formed in the wood annulus to receive the cotters as shown. By means of the cotters the rim ends can be pressed tightly against the ends of the detachable parts after the latter have been secured in position and so produce at the said ends close joints which effectively prevent access of dust and water to the interior of the tire. The employment of such a device also enables another useful result to be obtained inasmuch that on releasing the cotters the rim springs outward slightly, and in consequence when the rim is constructed to fit closely around the periphery of the felly $a$, difficulties which are often otherwise caused by the binding of the adjacent peripheral surfaces when it is required to remove the rim are effectively avoided. The cotters may be arranged to impart a positive expanding movement to the rim for releasing it from the wheel center. Also the plates $l$ can be dispensed with but the use of these is preferred as the securing of the parts $g$ in position is then made independent of the wood reinforcement $c$.

The invention is not limited to rims with inner wood reinforcements as it may be applied to other rims of the gapped type, nor is it limited to any particular means for securing the segmental parts in position. Also the invention is applicable to wheels having wire spokes as well as to wheels with wood spokes.

For securing the rim to the wheel, a convenient device comprises a number of bolts $n$ passed laterally through the wheel. Each bolt engages a fixed nut $o$ in the wheel and has provided on it a sleeve $p$ with an external claw $q$ for pressing against the side of the detachable rim. On slackening the bolt the sleeve is pushed outward by a shoulder on the bolt, so that the claw on the sleeve can be freely turned into an unobstructive position. With all the bolts released the rim can be readily removed. On tightening the bolts with the claws in the operative positions after the rim has been replaced on the wheel, the rim is firmly secured.

Having thus described my invention, what I claim as new and desire to secure by Letters Patent is:—

1. In road vehicle wheels, the combination with a gapped annulus provided with tire retaining flanges, of a plate connecting the ends of the annulus, and a pair of laterally movable segmental parts provided with tire retaining flanges adapted to be detachably secured on opposite sides of the plate and complete the annulus, substantially as described.

2. In road vehicle wheels, the combination with an annulus formed with a gap and adapted to receive a detachable tire around its outer periphery, of a slotted plate connecting the ends of the annulus, fastenings passing through the slots in the plate and the ends of the annulus, and a pair of laterally movable segmental parts adapted to be detachably secured on opposite sides of the plate and complete the annulus, substantially as described.

3. In road vehicle wheels, the combination with an annulus formed with a gap and adapted to receive a detachable tire around its outer periphery, of a slotted plate connecting the ends of the annulus, tapered cotters passing through the slots in the plate and the ends of the annulus, and a pair of laterally movable segmental parts adapted to be detachably secured on opposite sides of the plate and complete the annulus, substantially as described.

4. In road vehicle wheels, the combination with an annulus formed with a gap and adapted to receive a detachable tire around its outer periphery, of plates attached to the inner sides of the ends of the annulus, a slotted plate connecting the ends of the annulus, fastenings passing through the plates, and a pair of laterally movable segmental parts adapted to be secured on opposite sides of the plate connecting the ends of the annulus and complete the latter, substantially as described.

5. In road vehicle wheels, the combination with an annulus formed with a gap and adapted to receive a detachable tire around its outer periphery, of a plate connecting the ends of the annulus, a pair of laterally movable segmental parts placed on opposite sides of the plate and adapted to complete the annulus, dowels attached to one part and arranged to pass through the plate and enter holes in the other part, and a securing bolt passing through the said parts and the plate, substantially as described.

6. In road vehicle wheels, the combination consisting of a detachable and contractible rim formed with a gap and adapted to receive a detachable tire around its outer periphery; a pair of laterally movable segmental parts adapted to be secured in the gap and to complete the rim, an inner wood reinforcement for the rim, a felly adapted to receive the said rim, and means for detachably securing the rim in position, substantially as described.

In testimony whereof I have signed my name to this specification in the presence of two subscribing witnesses.

JOHN ALLAN CECIL WRIGHT.

Witnesses:
　EDWARD MARKS,
　JOHN MORGAN.